United States Patent

Johnson et al.

[11] Patent Number: 5,860,097
[45] Date of Patent: Jan. 12, 1999

[54] ASSOCIATIVE CACHE MEMORY WITH IMPROVED HIT TIME

[75] Inventors: David J. Johnson; Stephen R. Undy, both of Fort Collins, Colo.

[73] Assignee: Hewlett-Packard Company, Palo Alto, Calif.

[21] Appl. No.: 717,786

[22] Filed: Sep. 23, 1996

[51] Int. Cl.$^6$ .................................................. G06F 12/08
[52] U.S. Cl. ............................. 711/128; 365/49; 711/168
[58] Field of Search .................................... 711/128, 137, 711/168, 169, 145; 365/49

[56] References Cited

U.S. PATENT DOCUMENTS 5,014,195  5/1991  Farrell et al. ............................ 711/128
5,577,225  11/1996  McClure .................................. 711/118

Primary Examiner—Eddie P. Chan
Assistant Examiner—Hiep T. Nguyen
Attorney, Agent, or Firm—Augustus W. Winfield

[57] ABSTRACT

An associative cache memory for a computer with improved cache hit times. All possible data items are presented to bus driver circuits, thereby deferring data selection as long as possible. Driving and multiplexing are combined. The output of tag comparison directly selects at most one set of driver circuits. As a result, the only processing time in series with tag comparison is driver circuit selection. Since the data selection delay in series with tag comparison delay is reduced, the time delay is reduced for a clock edge for data driving after tag comparison, thereby enabling a faster clock.

1 Claim, 4 Drawing Sheets

ASSOCIATIVE CACHE MEMORY WITH IMPROVED HIT TIME

FIELD OF INVENTION

This invention relates generally to computer memory systems and more specifically to improving hit time in associative cache memory.

BACKGROUND OF THE INVENTION

Most computer systems employ a multilevel hierarchy of memory systems, with fast but limited capacity memory at the highest level of the hierarchy and proceeding to slower but higher capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches.

If a processor requests an item from a cache and the item is present in the cache, the event is called a cache hit. If a processor requests an item from a cache and the item is not present in the cache, the event is called a cache miss. In the event of a cache miss, the requested item is retrieved from a lower level of the memory hierarchy. In many processor designs, the time required to access an item for a cache hit is one of the primary limiters for the clock rate of the processor. Therefore, optimization of cache hit timing is critical for performance. There is an ongoing need for improvement in cache hit times for computer processors.

The minimum amount of memory that can be transferred into or out of a cache is called a line, or sometimes a block. Typically, memory is organized into words (for example, 32 bits per word) and a line is typically multiple words (for example, 16 words per line). Memory may also be divided into pages, with many lines per page.

If a cache stores an entire line address along with the data, any data line can be placed anywhere in the cache. If a line can be placed anywhere in the cache, the cache is said to be fully associative. As a space saving alternative, the least significant bits of an address may be used to designate one specific location within the cache, with the remaining set of more significant bits of each address stored along with the data. The number used to designate a location within a cache is commonly called an index and the remaining set of bits required to define a physical address for a line is commonly called a tag. In a cache with indexing, a line with a particular address can be placed only at the one place within the cache designated by the index. If a line can appear at only one place in the cache, the cache is said to be direct mapped (and is said to have low associativity). In an alternative design, a cache may be organized into sets, each set containing two or more lines. If a line can be placed in only one of the sets, the cache is said to be set associative.

With direct mapping, when a line is requested, only one line in the cache has matching index bits. Therefore, the data can be retrieved immediately and driven onto a data bus before the system determines whether the rest of the address matches. The data may or may not be valid, but in the usual case where it is valid, the data bits are available on a bus before the system determines validity. With associative caches, it is not known which line corresponds to an address until the full address is compared. That is, in associative caches, the result of tag comparison is used to select which data bits are presented to the processor. In associative caches, the longest task time is often the time required to compare the tag of the requested line to the tags of the lines within the cache and this tag comparison time must be in series with at least part of data selection time. There is a need for improvement in the overall time for tag comparison and data selection for associative caches.

SUMMARY OF THE INVENTION

Cache hit times are improved by minimizing the amount of data selection circuitry beyond the point where input from tag comparison is received. All possible data lines are presented to bus driver circuits, thereby deferring data selection as long as possible. Then, in the final stage of combinatorial logic, driving and multiplexing are combined with the output of tag comparison directly selecting at most one set of driver circuits. As a result, the only processing time in series with tag comparison is driver circuit selection. Since the data selection delay in series with tag comparison delay is reduced, the time delay is reduced for a clock edge for data driving after tag comparison, thereby enabling a faster clock.

DETAILED DESCRIPTION OF THE PREFERRED EMBODIMENT OF THE INVENTION

Figure 1:
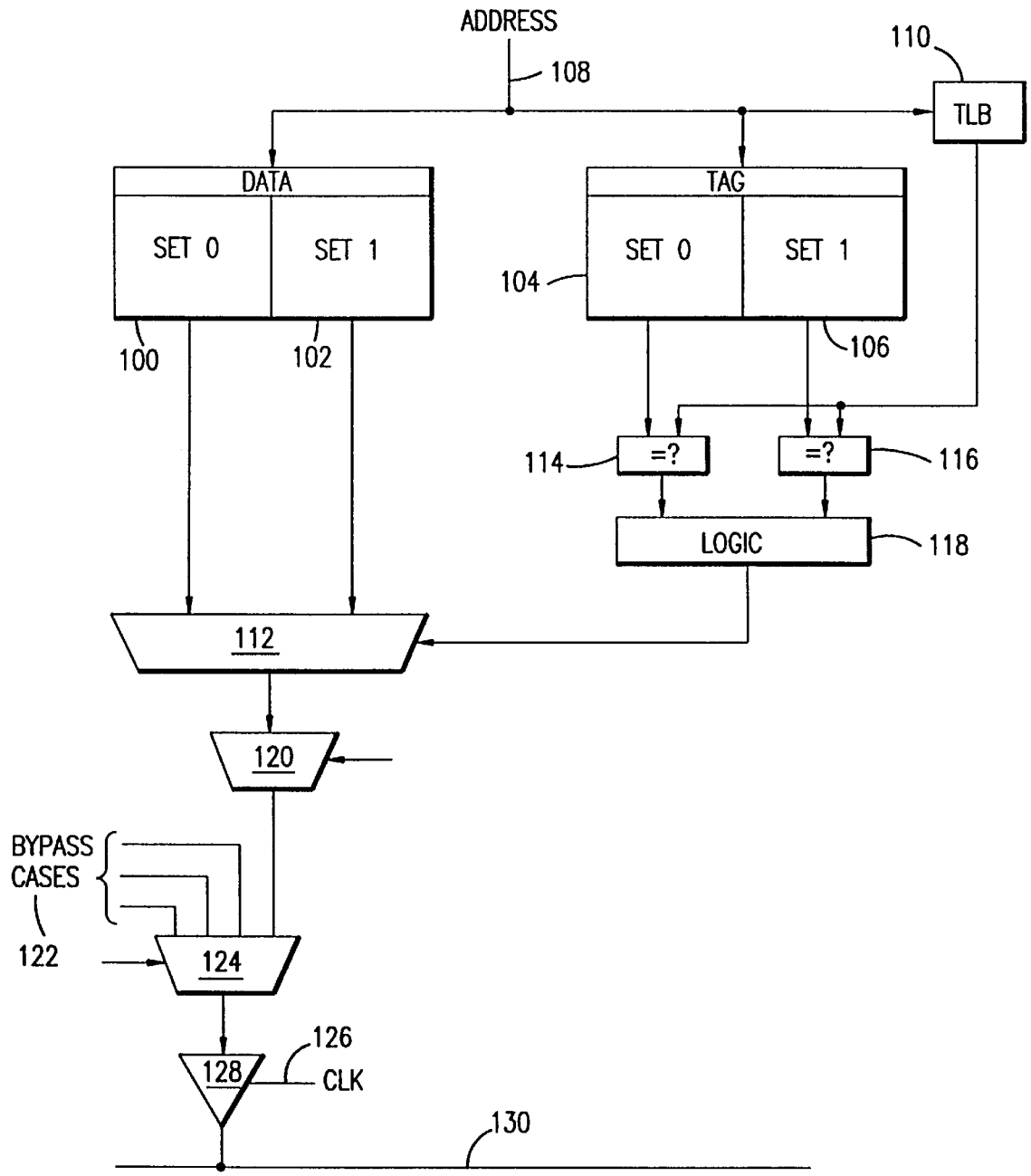
FIG. 1 is a block diagram schematic illustrating a typical set-associative cache system with tag comparison time partially in series with data selection time.

FIG. 1 illustrates a two-way set-associative cache. There are two sets of data lines (100, 102) and two sets of address tags (104, 106). A virtual address 108 is presented by a processor to a memory system including the cache of FIG. 1. One data line from each data set (100, 102), at a location corresponding to low order bits of the virtual address 108, are presented to a digital selector (multiplexer) 112. High order bits (tags) of an address, at a location corresponding to low order bits of the virtual address 108, are presented to digital comparators 114 and 116. The memory system also includes a Translation Lookaside Buffer (TLB) 110 for translating virtual addresses to real addresses. A TLB is not necessary for the invention but it illustrates the types of timing delays that are improved by the invention. Tag entries from the sets of address tags (104, 106) are compared to real addresses by the digital comparators 114 and 116. If a tag entry matches the high order bits of the real address, there is a cache hit, and additional logic 118 provides a signal used to select one of the data lines presented to multiplexer 112. In general, because of the additional propagation delays through the TLB 110, comparators 114 and 116, and logic 118, data bits are presented to multiplexer 112 before a selection signal is generated by logic 118. In general, a request for data is a request for less than a data line. Alternatively, in general, a line of data has more bits than the width of a data bus. An additional multiplexer 120 is used to select the required portion of a data line, as determined by lower order address bits.

Data being moved from a lower level of a memory hierarchy into a cache and data being moved from a cache into a lower level of the memory hierarchy may be temporarily stored in various buffers. Typically, when an item is requested, an address match is also performed on these buffers. If the requested item is in one of the buffers, it is provided to the processor with the same timing as a cache hit. In FIG. 1, these possible non-cache sources for the data are designated bypass cases 122 and a separate multiplexer 124 selects whether data from a buffer or data from the cache are presented to the processor. In the system illustrated in FIG. 1, the bypass cases are less than the width of a line. If the bypass cases are full lines of data, multiplexer 120 may be placed after multiplexer 124. At a proper edge of a clock 126, the requested data bits are driven onto a bus 130 by a set of drivers 128.

Figure 2:
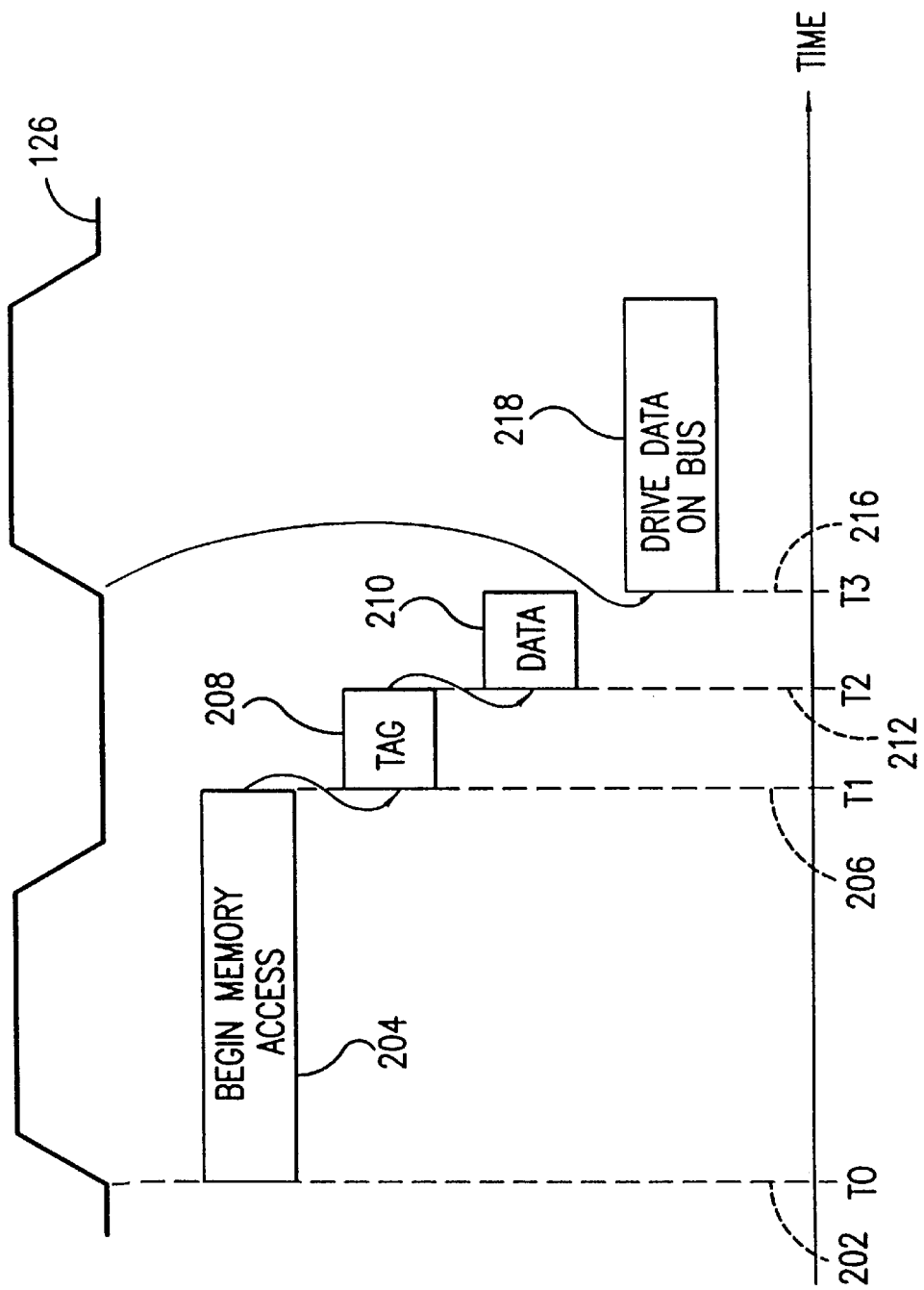
FIG. 2 is a timing diagram for the cache system of FIG. 1.

FIG. 2 illustrates timing for the cache system of FIG. 1. First, a processor initiates an instruction requiring memory access. On a rising edge of clock 126 (time T0 (202)), a virtual address is presented to the cache system. At time T1 (206), data bits from the memory elements are available at the inputs of multiplexer 112 (FIG. 1) and addresses from the memory elements are available at the inputs of comparators 114 and 116 (FIG. 1). During the time delay represented by box 208, the digital comparators wait on the real addresses from the TLB and then compare the address tags from the cache with real addresses from the TLB. Then, at time T2 (212) additional combinatorial logic (FIG. 1, 118, 112, 120, 124, 128) provides data to be driven onto bus 130, with a delay represented by box 210. At T3 (216), at a rising edge of clock 126, the retrieved data bits are driven onto the bus by a set of driver circuits. The total delay time represented by boxes 208 and 210 limits when the clock 126 can rise, thereby limiting the clock frequency. The strategy of the invention is to perform earlier than time T2 (212) as much as possible of the logic contributing to the delay represented by box 210 to minimize the overall time from T1 (206) to T3 (216).

Figure 3:
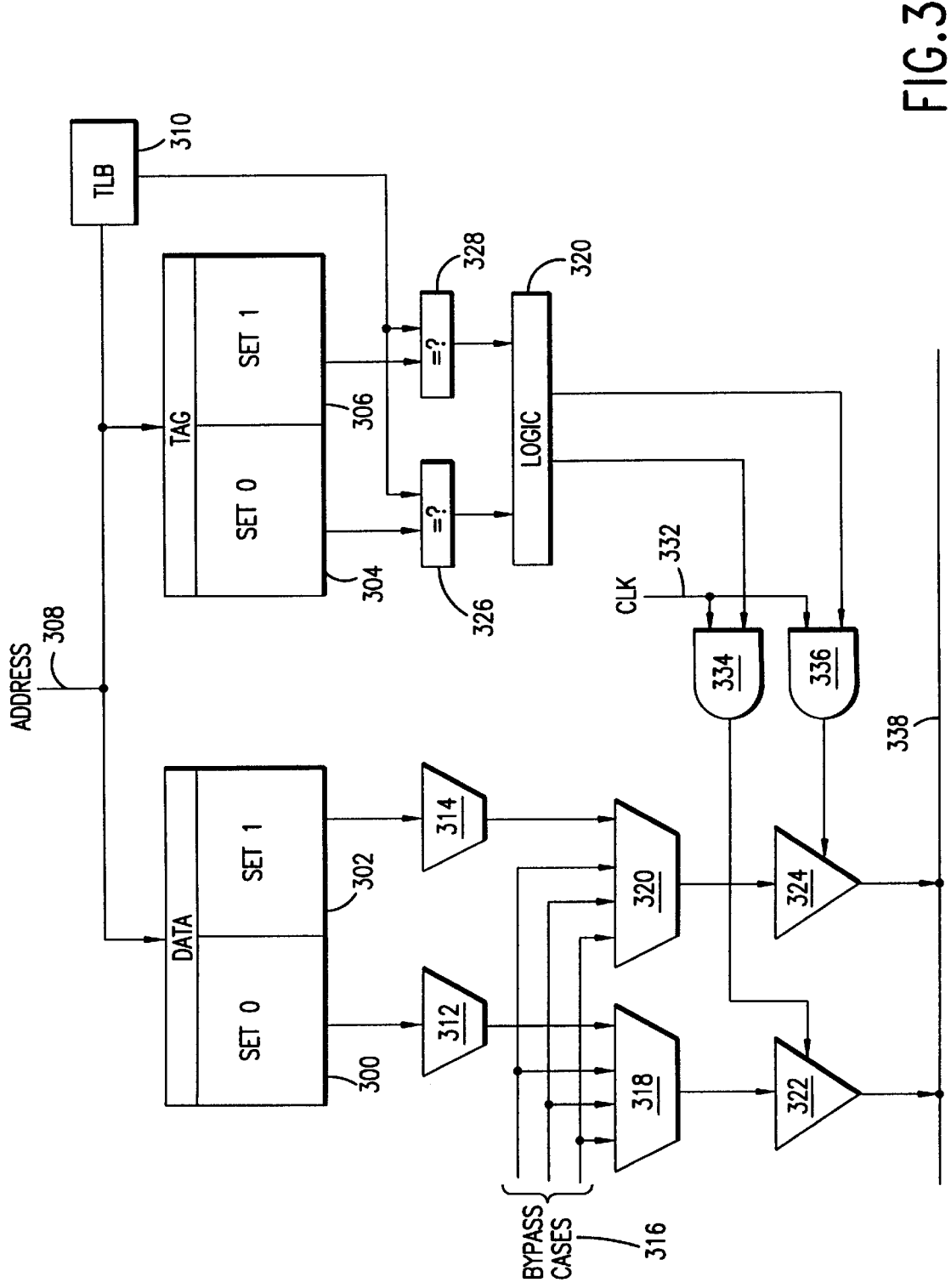
FIG. 3 is a block diagram schematic illustrating an improved set-associative cache system in accordance with the invention.

FIG. 3 illustrates a cache system with the improvements of the invention. There are two sets of data lines (300, 302) and two sets of address tags (304, 306). A virtual address 308 is presented by a processor to a memory system including the cache of FIG. 3. One data line from data set 300, at a location corresponding to low order bits of the virtual address 308, is presented to a selector (multiplexer) 312, which in turn selects the appropriate part of the data line. One data line from data set 302, at a location corresponding to low order bits of the virtual address 308, is presented to a multiplexer 314, which in turn selects the appropriate part of the data line. A multiplexer 318 selects among the output of multiplexer 312 and bypass cases 316. A multiplexer 320 selects among the output of multiplexer 314 and bypass cases 316. Multiplexers 318 and 320 provide inputs to sets of drivers 322 and 324 respectively, even if there is no cache hit.

High order bits (tags) of an address, at a location corresponding to low order bits of the virtual address 308, are presented to digital comparators 326 and 328. Tag entries from the sets of address tags (304, 306) are compared to real addresses from the translation lookaside buffer 310 by the digital comparators 326 and 328. If a tag entry matches the high order bits of the real address, there is a cache hit, and additional logic 330 provides a signal used to select driver set 322 or driver set 324, but not both. Logical AND gates 334 and 336 select a driver set at a rising edge of a clock 332. Driver sets 322 and 324 are tri-stated so that if a driver set is not selected the output impedances are high.

Figure 4:
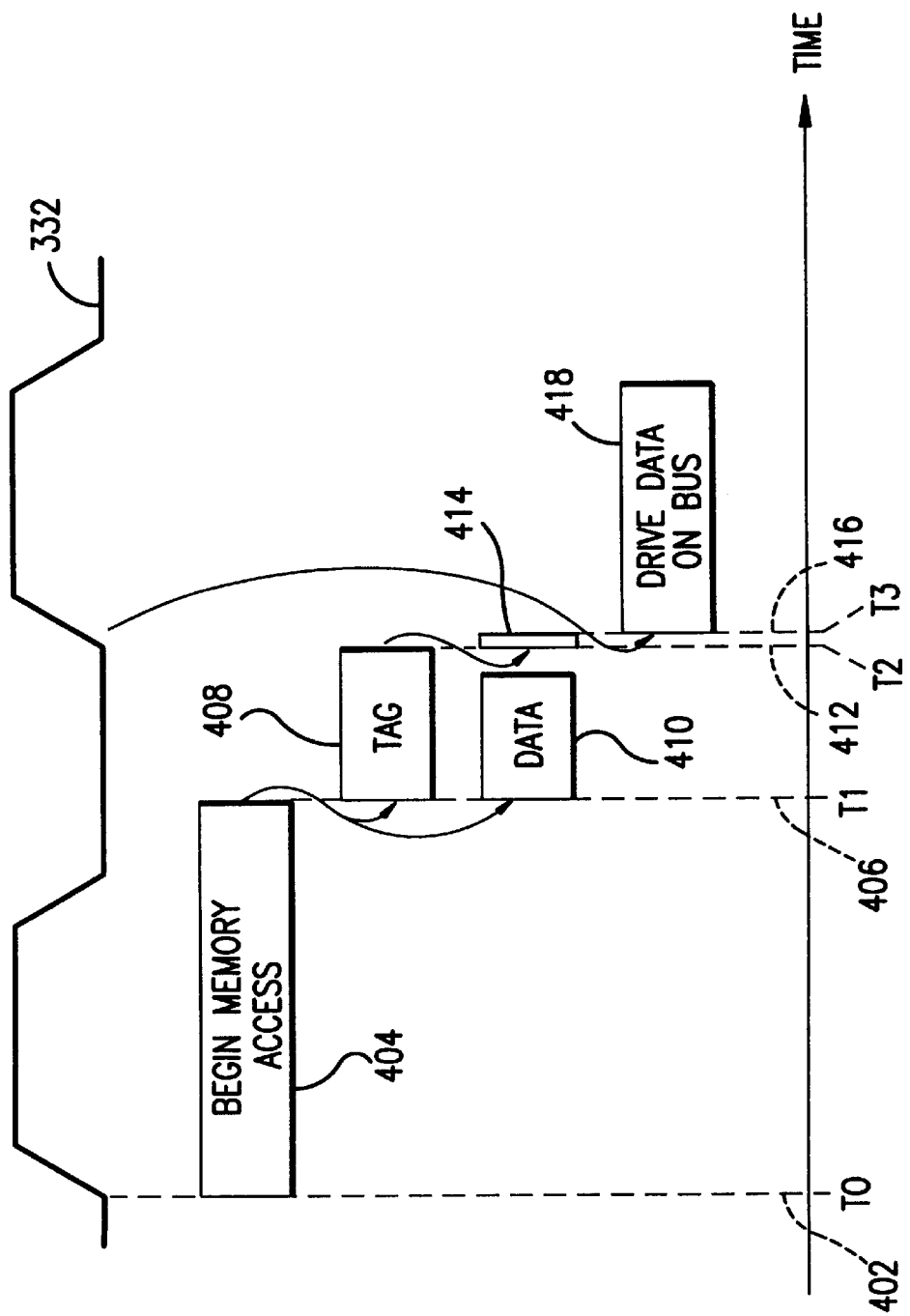
FIG. 4 is a timing diagram for the cache system of FIG. 3.

FIG. 4 illustrates timing for the cache system illustrated in FIG. 3. On a rising edge of clock 332 (time T0 (402)), a virtual address is presented to the cache system. At time T1 (406), data bits from the memory elements are available at the inputs of multiplexers 312 and 314 (FIG. 3) and addresses from the memory elements are available at the inputs of comparators 326 and 328 (FIG. 3). During the time delay represented by box 408, the comparators wait for real addresses from the TLB and then compare the address tags from the cache with real addresses from the TLB. During the time delay represented by box 410, multiplexers 312 and 314 (FIG. 3) select a portion of a line and multiplexers 318 and 320 select among cache data and bypass cases. Then, at time T2 (412), the only remaining delay (box 414) is logically ANDing the outputs of tag logic (FIG. 3, 330) with clock signal 332 to select the set of drivers (FIG. 3, 322 and 324). At T3 (416), at a rising edge of clock 332, the retrieved data bits are driven onto the bus. In FIG. 4, delay 408 is depicted as being longer than delay 410. The opposite may be true, with whichever delay is longest determining time T2 (412). Comparing FIGS. 2 and 4, delays represented by boxes 204 and 404 are identical, and delays represented by boxes 208 and 408 are identical. However, in FIG. 4, the delay after tag comparison, represented by delay 414, is much shorter than the delay after tag comparison in FIG. 2, represented by delay 210. As a result, time T3 in FIG. 4 (416) can occur earlier than time T3 in FIG. 2 (216), thereby enabling an increased frequency for clock 332 relative to clock 126.

In the embodiment used for illustration there are only two sets. In general, if there are N sets, N possible data items must be presented to N sets of driver circuits for selection.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An associative cache memory system for a computer, the computer including a data bus, the cache memory system comprising:

an address memory;

a data memory;

a data circuit connected between the data memory and the data bus, the data circuit retrieving a plurality of data items from the data memory, the data circuit having driver circuits connected to the data bus for the plurality of data items, the driver circuits having enable inputs;

a plurality of comparators, comparing a requested address from the computer to stored addresses in the address memory, each comparator generating a hit signal based on the result of its comparation;

a selection circuit connected to the enable inputs of the driver circuits and receiving only the hit signals from the plurality of comparators, the selection circuit enabling driver circuits for at most one selected data item in the plurality of data items, based only on the received hit signals;

wherein the data circuit further having a multiplexer circuit, the multiplexer circuit receiving data from the data memory and receiving data from sources other than the associative cache, the multiplexer circuit having outputs connected to inputs of the driver circuits; and wherein signals from the multiplexer circuit outputs having levels that are valid earlier than signals at the enable inputs of the driver circuits.

* * * * *